F. H. KERR.
LAND CARE MECHANISM.
APPLICATION FILED SEPT. 14, 1920.
1,428,242.
Patented Sept. 5, 1922.
2 SHEETS—SHEET 2.
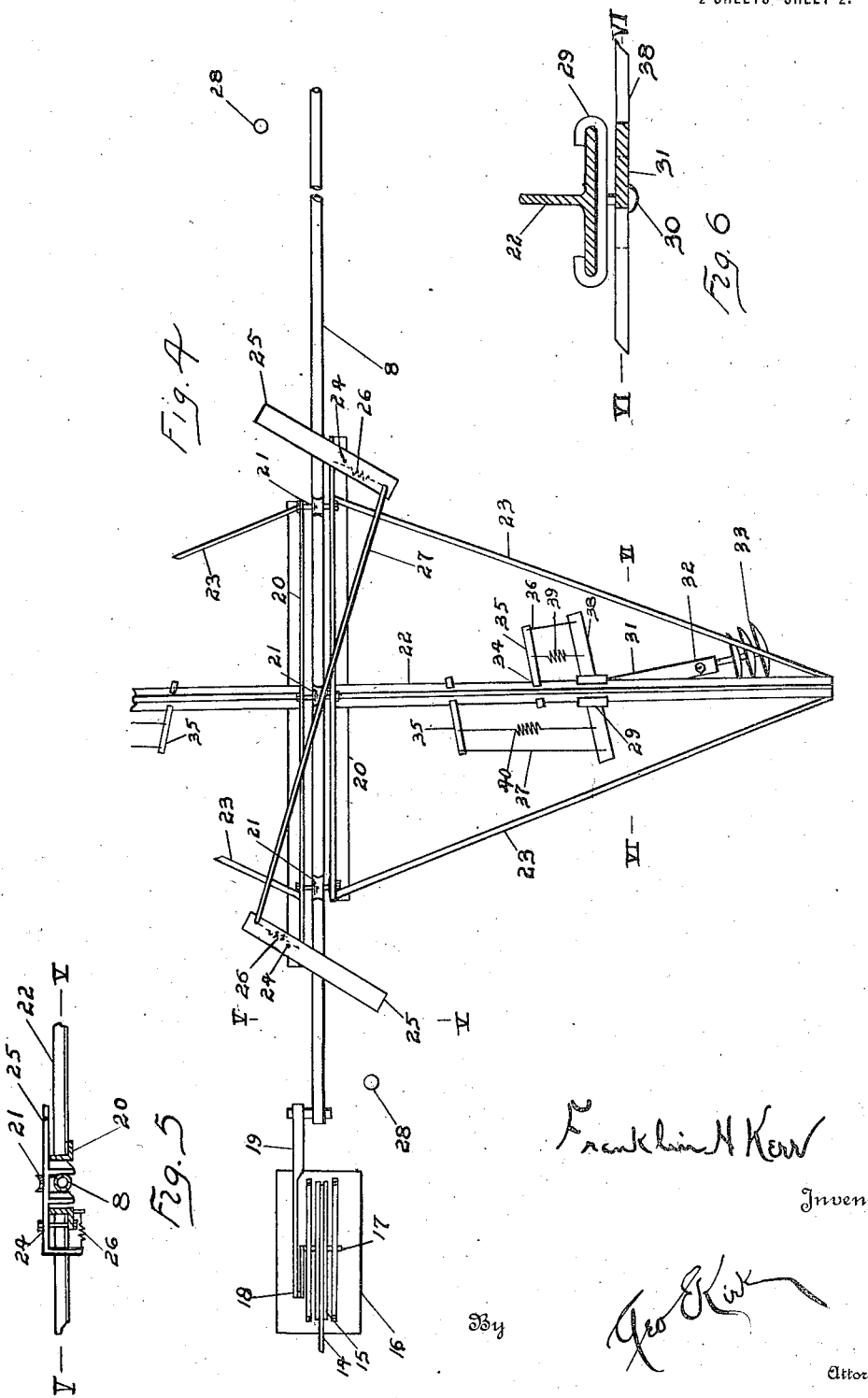
Franklin H Kerr
Inventor
By Geo E Kirk
Attorney Patented Sept. 5, 1922.

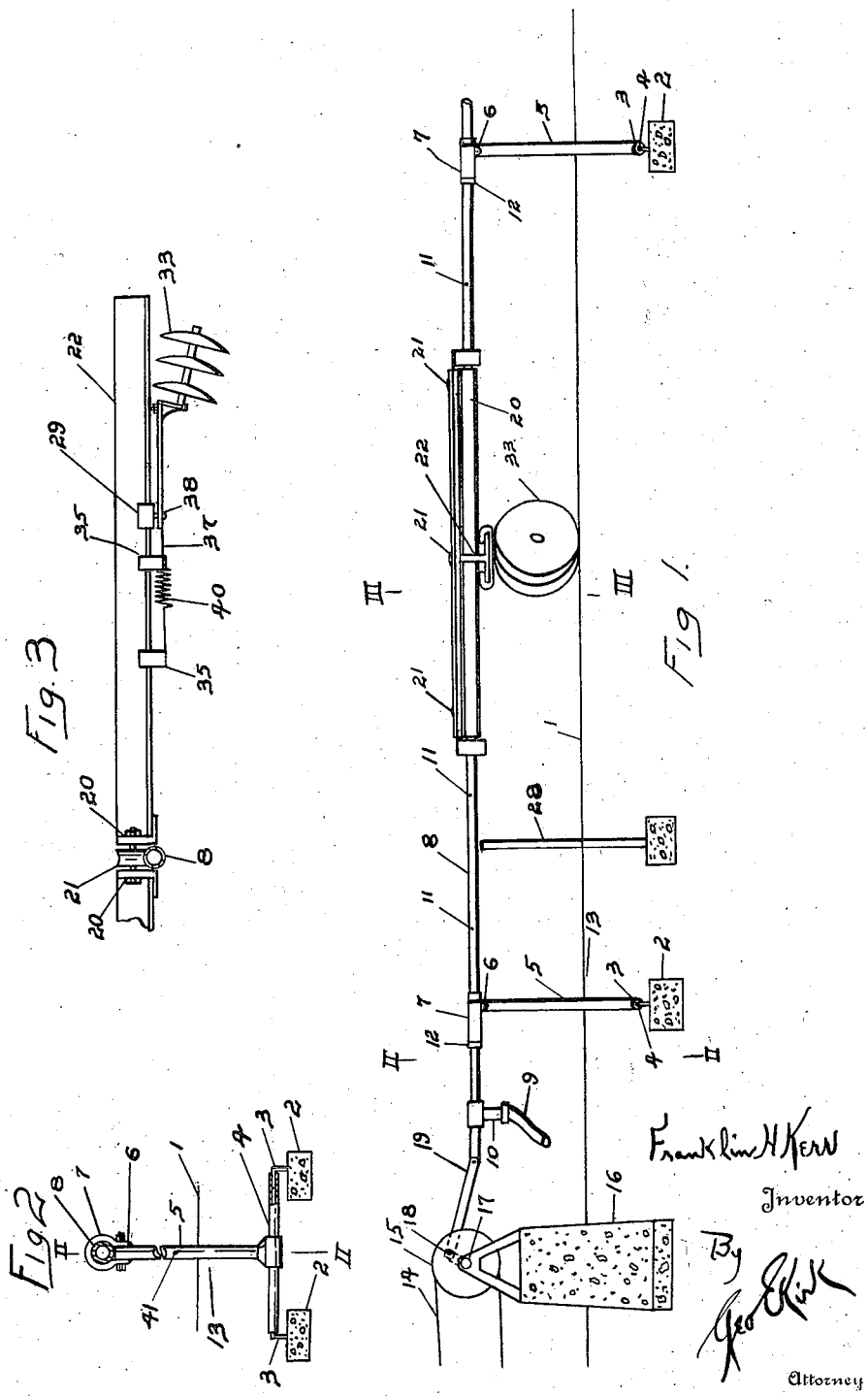

1,428,242

UNITED STATES PATENT OFFICE.

FRANKLIN H. KERR, OF LUCAS, OHIO.

LAND-CARE MECHANISM.

Application filed September 14, 1920. Serial No. 410,318.

*To all whom it may concern:*

Be it known that I, FRANKLIN H. KERR, a citizen of the United States of America, residing in Lucas County, Ohio, have invented new and useful Land-Care Mechanism, of which the following is a specification.

This invention relates to mechanism for the care of land for efficient and economical production of crops therefrom.

This invention has utility as an irrigation installation adapted for soil cultivation.

Referring to the drawings:

Fig. 1 is a side elevation of an embodiment of the invention, shown as cultivation means, in this instance in connection with an irrigation system;

Fig. 2 is a section on the line II—II, Fig. 1;

Fig. 3 is a section on the line III—III, Fig. 1;

Fig. 4 is a fragmentary plan view of traveling tool actuator;

Fig. 5 is a section on the line V—V, Fig. 4; and

Fig. 6 is a section on the line VI—VI, Fig. 4.

Across a field 1, and embedded to leave a maximum area for cultivation, may be a series of anchors or blocks 2, disposed in pairs to provide pivot bearings 3 for cross member 4, having medially upstanding stem 5. These stems 5 provide an aligned series of rockable supports upwardly terminating in pivot pin bearings 6 engaging sleeves 7 fast with rigid member 8 to carry such member a sufficient distance clear of the ground to avoid too much interference with vegetation.

When used for irrigation, water supply hose 9, coupled to arm 10 may conduct the volume of water under pressure into the pipe member 8 for discharge therefrom at spray jet openings 11. By rocking the arm 10, the pipe 8 may be oscillated to direct the spray from openings 11 upward, or along either side thereof. This oscillation is permitted, for the supporting sleeves 7 are only fast with the member 8 as against reciprocation therealong, a collar 12, on each side of the sleeve 7 anchoring the sleeve as to this pipe. In the region 13, adjacent the support uprights 5, the soil under cultivation is sufficiently loose to permit slight reciprocation of the pipe 8, but is firm enough to hold the pipe from settling down.

This irrigation installation, which may be by parallel lines of pipe across the field 1, say at intervals of 40 ft. between pipes permits of watering utility, while it simultaneously provides the power transmitting means for completing the utility of this land care mechanism in cultivation, or other tool operations.

To this end of power transmission utility, a source of energy, whether windmill, electric motor, water power, steam or internal combustion motor, may drive belt 14 for operating pulley 15 in fixed upright 16 having shaft 17 provided with crank 18 from which extends connecting rod 19 to the pipe 8. This rigid base or upright 16, in its connection to the pipe 8, also limits settling down of such pipe. This drive is effective for reciprocating the pipe 8, which reciprocation is permitted by the rockable supports 5.

From this power source of the reciprocable member 8, an actuator may be caused to travel across the field 1. As herein shown this actuator comprises a pair of angle bars 20, parallel with the pipe 8, and mounted to ride therealong by grooved rollers 21 between the bars 20. Transversely of the pipe 8, medially of the bars 20, extend T-members 22, which with 40 ft. spacing between the pipes 8, should approximate 20 ft. in length outward from the pipe 8 by which they are carried. These T-members 22 are braced by struts 23 from the terminal portions of the bars 20. There is thus formed a double A-frame or diamond shaped actuator to be actuated along the pipe 8 by the retarding action of drag of the tool, to thereby hold the actuator during the recover movement of the pipe 8.

The driving of the actuator or shifting thereof as to the pipe 8 is effected by an intermittent grip device comprising a fulcrum 24 for a lever 25 having a pair of downwardly extending arms providing opposing pipe gripping jaws. A spring 26 from beyond the fulcrum 24 on the lever 25, to the bar 20 carrying the lever, is so disposed as to swing the lever 25 past the dead point of the fulcrum to hold the jaws in pipe gripping position. One of these grips of the intermittent grip device is disposed at each end of the actuator with a link 27 therebetween, with sufficient play to permit each lever 25 to hold firmly. As these levers are oppositely disposed, the actuator is stiffened in its drive or grip stroke. These devices each slide on the recover stroke. As these reciprocations occur, each drive stroke may progress the actuator a stroke distance, say 10 inches. The rate of travel may be determined by the number of strokes per minute, which in practice may run say 40 strokes per minute. When the actuator approaches the end of the pipe 8, there may be effected an automatic reversal of the grip device, by a post 28 being struck by the grip device carried with the actuator. This striking of the grip device rocks each lever 25, through the link 27, and they are held in the reverse position by the springs 26. Accordingly as the reciprocations of the pipe 8 continue, the actuator travel is now in the reverse direction. This alternation back and forth across the field is thus kept up automatically as long as the driving is maintained, by the reversing posts 28.

Advantage is taken of this automatic reversal for automatically varying the range of tool operation. At a single setting a tool may be operated in a single line across the field 1. However, as herein adapted, the actuator is provided with duplicate tools.

Loosely mounted on each T-member 22 is a channel slide 29, embracing the base flanges of the member 22. Pivot pin 30 mounts T-lever 31 to swing in a horizontal plane from this slide 29. Attachment means 32 may serve to connect a gardening tool, seeder, or other device to this machine. In this instance the tool is shown as cultivator disks 33 dragging upon the ground of the field 1 and so far sustained by the ground and taking such portion of the load of the actuator off the pipe 8 that there is freedom for the pipe 8 to operate idly or for recover stroke in one direction, as against the reverse direction driving stroke which pulls the tool 33 through the soil.

This pulling of the tool 33 is a trailing action as permitted from the pin 30. The limit of this trailing is automatically fixed by intermittent grip device comprising jaws 34 on arms 35 connected by links 36, 37, to cross portion 38 of the T-lever 31. Springs 39, 40, hold the grip jaws 34 in engagement with the member 22, and the trailing across the field in one direction of travel of the actuator is maintained a constant distance from the pipe 8. As the actuator travel is reversed, the trailing tool 33, swings about to so operate the grip device arms 35 that the tool is stepped along the member 22 a definite distance for continuing soil cultivation in another range or row from the travel over. This range change is automatically effected for both tools in a similar manner as to the member 8 to balance the load. Adjustment of the links 37, 38, may vary the step distance of the transverse tool course changing grip devices.

For intensive agriculture, the positive installation of the irrigation system is a large item cared for in this apparatus. The expense in addition is merely the power drive and the actuator. As the irrigation may be operated in multiple, so a power drive may also be applied in multiple, but with a single actuator, such may be lifted off and used on different pipes, or taken from the field when not in use. Automatic power cultivation is accordingly simply and effectively carried out along definite rows in working the soil over rather extended areas. The member 8 may be several hundred feet in length.

While the movement of the rocking supports is but slight, such may be operated at less resistance by lubricating the bearings, for permitting which, oil holes 41 are provided in the stems 5.

While the structure is shown rigid as to its strains for pulling or in the work across the field, it has such flexibility transversely of the pipe 8, that it may readily conform to surface conditions, even as between opposite sides of the pipe 8.

What is claimed and it is desired to secure by Letters Patent is:

1. Land care mechanism including a drive device extending afield for travel in the line of its extent, an actuator transversely of said extent and travel of the device, and tools swingably connected to the actuator for shifting along the actuator transversely of the travel direction of the actuator.

2. Land care mechanism including a drive device extending afield, an actuator transversely of the device, a tool connected to the actuator on each side of the device for effecting travel of the actuator in the direction of the device extent, and means for effecting travel of the tools transversely of the device.

3. Land care mechanism including a drive device extending afield, an actuator transversely of the device, a tool connected to the actuator on each side of the device, and means swingable upon reversal of actuator travel by the device for swinging each tool for continued operation of such tool in reverse travel direction.

4. Land care mechanism including a drive device extending afield, an actuator transversely of the device, a tool connected to the actuator on each side of the device, and two shifting means transversely as to the device and swingable upon reversal of actuator travel by the device for continued operation of such tools in the reverse travel direction.

5. Land care mechanism including a series of supports, a reciprocable rigid member between the supports, and a land care tool actuator operable by the member.

6. Land care mechanism including a series of supports, a reciprocable rigid member between the supports, a land care tool actuator, and an intermittent grip device between the member and actuator for operating the actuator for shifting the actuator as to the member.

7. Land care mechanism including a series of supports, a pipe between the supports, a land care tool actuator, and a reversible intermittent grip device between the member and actuator for driving the actuator.

8. Land care mechanism including a series of supports, a reciprocable pipe between the supports, a land care tool actuator, an intermittent grip device coacting between the pipe and actuator, and means as to which the actuator may travel for reversing the device.

9. Land care mechanism including supports, power transmitting means between the supports, and a land care tool actuator extending transversely of the means for actuating tools on opposite sides of the means, there being mounting means for the tools permitting swinging of the tools as to the actuator upon reversal of travel direction of the actuator for continued operation of the same tools in the return direction.

10. Land care mechanism including a traveling tool actuator, tools, and connecting means between the tools and actuator coacting upon reversal of the travel direction of the actuator for shifting the tools along the actuator.

11. Land care mechanism including a traveling tool actuator embodying an intermittent grip device, and means for mounting a tool to trail from said device.

12. Land care mechanism including a tool actuator, power means for moving the actuator in opposite directions of travel, said actuator embodying an intermittent grip device, and means for mounting a tool to trail from the device and coacting at actuator travel reversal to effect shifting of the tool by means of the device along the actuator.

In witness whereof I affix my signature.

FRANKLIN H. KERR.